(No Model.)
J. N. CLOUSE.
WHEEL FOR VEHICLES.
No. 449,205. Patented Mar. 31, 1891.
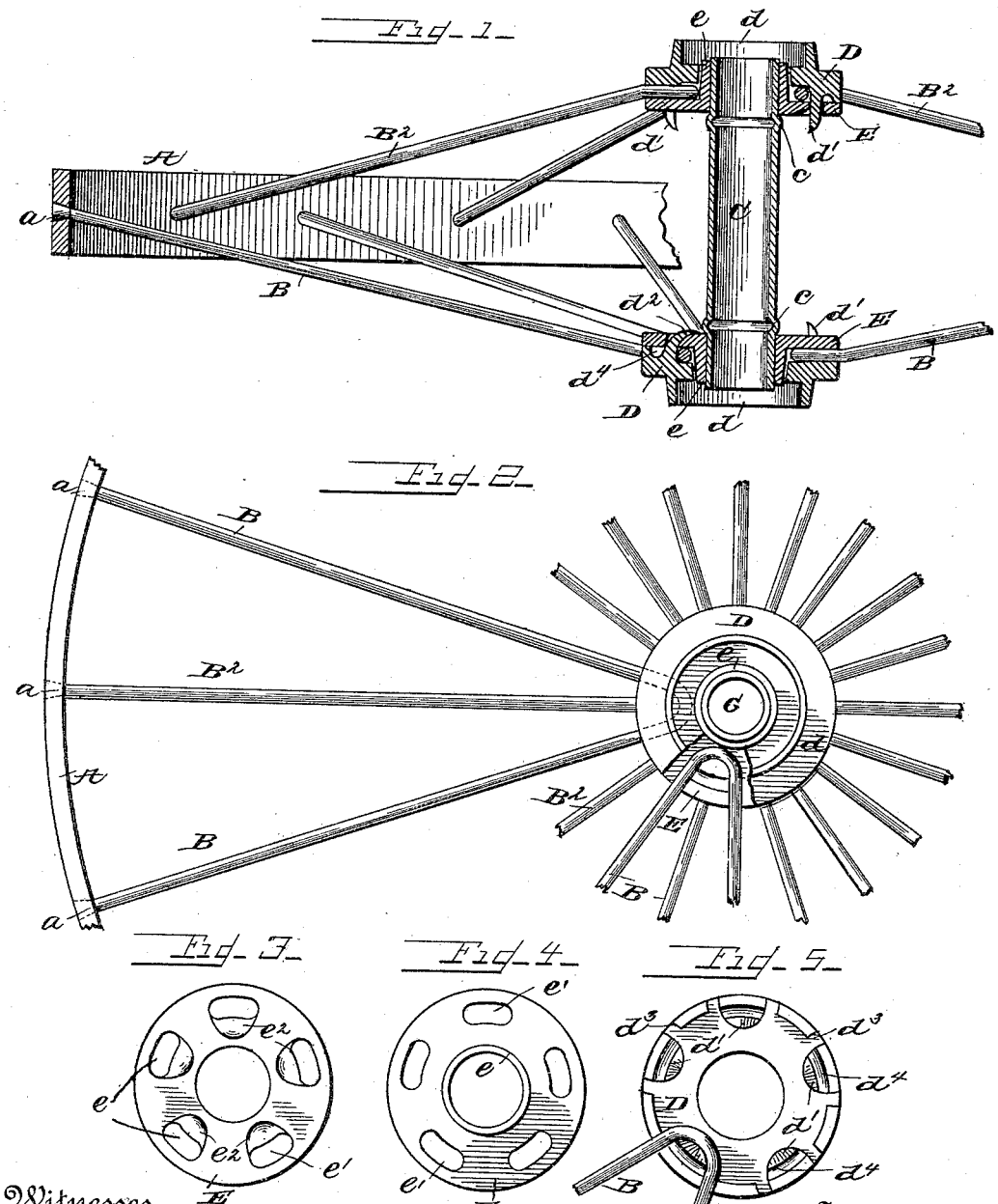

UNITED STATES PATENT OFFICE.

JOSEPH N. CLOUSE, OF ST. LOUIS, MISSOURI.

WHEEL FOR VEHICLES.

SPECIFICATION forming part of Letters Patent No. 449,205, dated March 31, 1891.

Application filed May 12, 1890. Serial No. 351,550. (No model.)

*To all whom it may concern:*

Be it known that I, JOSEPH N. CLOUSE, a citizen of the United States, residing at the city of St. Louis, and State of Missouri, have invented new and useful Improvements in Wheels for Vehicles and other Uses, of which the following is a specification.

My invention relates to improvements in metal wheels for vehicles, and especially such wheels as are used for children's carriages, velocipedes, wagons, and tricycles; and the special object of my invention is to construct a metal hub for wheels, (such as are usually termed "suspension wheels,") so that all of its parts may be cast or pressed in proper shape and put together with very little labor or fitting. Second, my object is to provide a wheel that is light, simple, and durable in its construction, the size of the wheel and number of its spokes being varied to suit the work on which it is to be used. I attain these objects by the mechanism illustrated in the drawings and in the manner hereinafter described.

In the drawings, Figure 1 is a longitudinal center section of the hub with a section of the rim. Fig. 2 is a side view of the hub with a section of the rim. Fig. 3 is an outside face view of the flanged cap-plate E. Fig. 4 is an inside face view of the flanged cap-plate E. Fig. 5 is an inside face view of the head-piece D of the hub, in all of which pieces and views like letters refer to like parts.

C is a rolled-metal box, tubular in shape and provided with two outwardly-formed beads $c$ $c$ near the ends of it. To each end of this box C is closely fitted a flanged cap-plate E with a flange-extension $e$, which is bored out to fit the box C. This plate E is also provided with a series of two or more elongated slots or openings $e'$ $e'$ and a corresponding series of beveled depressions $e^2$ $e^2$ on the inner edges of them. These elongated openings vary in number according to the number of spokes desired in the wheel.

On each end of the hub around and against the cap-plate E is placed the hub head-piece D, which is provided with grooves $d^3$ $d^3$ for the return wire spokes B B, and a corresponding series of pins or wedges which terminate in tangs or spurs $d'$, which clinch down, as $d^2$, Fig. 1. A valley $d^4$ extends around at the base on the outside of the series of pins or wedges $d'$. On the opposite side of this head-piece D a sand-band $d$ extends out. This series of pins or wedges vary in number according to the number of spokes desired in the wheel, and the number of tangs $d'$ are the same as the number of elongated openings $e'$ $e'$ in the cap-plate E, through which they extend, and are clinched down into the beveled depressions $e^2$ $e^2$ immediately over the bend of the wire spokes B B. The spokes B B are the usual return spokes, two in one, the ends of which are riveted at $a$ $a$ in the rim or felly A and return around the base of the tangs or spurs $d'$ between the cap-plate E and the hub head-piece D, the clinching of which holds the parts D and E firmly together. The spokes from the opposite ends of the hub alternate in the rim, as B and B². There is nothing fixed in the diameter of the wheel or the size of its various parts. By this special construction of a wheel I obtain the several advantages of lightness, open appearance, cheapness, and great strength of parts. In the setting up of the wheel the two end sections of the hub are put together separately, each having half of the spokes in the wheel. Taking the head-piece D, the wire spokes B B, two in one, are placed in the grooves around the base of the tangs or spurs $d'$ $d'$. Then the cap-plate E is placed over them, so that the tangs or spurs $d'$ $d'$ extend through the elongated openings $e'$ $e'$ and the flanged extension $e$ projecting through the head-piece D. Then the two pieces D and E are pressed firmly together and the tangs $d'$ $d'$ are clinched down into the beveled depressions $e^2$, as shown at $d^2$, Fig. 1. One of these sections is forced onto each end of the box C. The spokes B B² are cut to an even length to suit the diameter of the tire A. The ends of the spokes are inserted in the holes in the tire and drawn up to a tension and riveted and the wheel is complete.

I am aware that suspension wheels with return wire spokes riveted into a rim or tire are in use; also, that the rolled sheet-steel box C is the matter of an existing patent. I therefore do not claim such broadly, but adapt my invention to their use.

Having thus described my invention, what I claim as new, and desire to secure by Letters Patent, is—

1. In a metal wheel for vehicles and other uses, the head-piece D, with its sand-band $d$, series of two or more wedges terminating in tangs $d'$ and $d^2$, its grooves $d^3$ $d^3$, and valley $d^4$, in combination with the spokes B B and $B^2$ $B^2$ and the rim or tire A, substantially as described and specified.

2. In a metal wheel for vehicles and other uses, the flanged cap-plate E, with its flange-extension $e$, its series of two or more elongated slots or openings $e'$ $e'$, and corresponding series of beveled depressions $e^2$ $e^2$, in combination with the rolled-metal box C, substantially as described and set forth.

3. In a hub for metal wheels, the head-piece D, with its sand-band $d$, series of two or more wedges terminating in tangs $d'$, (and $d^2$ clinched,) and its grooves $d^3$ $d^3$ and valley $d^4$, in combination with the flanged cap-plate E, with its flange-extension $e$, its series of two or more elongated slots or openings $e'$ $e'$, and corresponding series of beveled depressions $e^2$ $e^2$, into which the tangs $d'$ are clinched firmly, securely holding the two parts together, substantially as specified.

In testimony whereof I have hereunto set my hand and seal in the presence of two subscribing witnesses.

JOSEPH N. CLOUSE.

Witnesses:
M. B. DICKIE,
PAUL F. COSTE.